US006005739A

United States Patent [19]

Yun

[11] Patent Number: 6,005,739

[45] Date of Patent: Dec. 21, 1999

[54] TECHNIQUE FOR CONTROLLING THE POSITION ERROR SIGNAL OF A DISK DRIVE

[75] Inventor: Jong-Yun Yun, Suwon, Rep. of Korea

[73] Assignee: SamSung Electronics, Co., Ltd., Kyungki-do, Rep. of Korea

[21] Appl. No.: 08/879,856

[22] Filed: Jun. 20, 1997

[30] Foreign Application Priority Data

Jun. 24, 1996 [KR] Rep. of Korea ...................... 96-23328

[51] Int. Cl.[6] ...................................................... G11B 5/596

[52] U.S. Cl. ..................................... 360/77.04; 360/77.02

[58] Field of Search ................................... 360/75, 77.02, 360/77.04, 77.05, 77.07, 77.08

[56] References Cited

U.S. PATENT DOCUMENTS

| | | | |
|---|---|---|---|
| 4,412,165 | 10/1983 | Case et al. | 360/77 X |
| 4,823,212 | 4/1989 | Knowles et al. | 360/77.08 |
| 4,910,617 | 3/1990 | Brunnett et al. | 360/78.14 |
| 4,982,297 | 1/1991 | Tsujisawa | 360/77.04 |
| 5,241,433 | 8/1993 | Anderson et al. | 360/77.04 |
| 5,339,207 | 8/1994 | Moon et al. | 360/77.05 |
| 5,544,135 | 8/1996 | Akin, Jr. et al. | 369/32 |
| 5,592,348 | 1/1997 | Strang, Jr. | 360/77.08 |
| 5,710,677 | 1/1998 | Teng et al. | 360/77.08 |
| 5,798,883 | 8/1998 | Kim | 360/31 |

FOREIGN PATENT DOCUMENTS

| | | |
|---|---|---|
| 59-218678 | 12/1984 | Japan . |
| 63-091881 | 4/1988 | Japan . |
| 63-313373 | 12/1988 | Japan . |
| 2-053270 | 2/1990 | Japan . |
| 2-121168 | 5/1990 | Japan . |
| 2-230571 | 9/1990 | Japan . |
| 3-263662 | 11/1991 | Japan . |
| 5-303854 | 11/1993 | Japan . |
| 8-077725 | 3/1996 | Japan . |

*Primary Examiner*—William J. Klimowicz

*Attorney, Agent, or Firm*—Robert E. Bushnell, Esq.

[57] ABSTRACT

A technique for controlling the position error signal of a disk drive using a disk recording a servo burst signal for controlling an on-track position of a head includes: checking whether the position error signal is a high level from the region recording the servo burst signal, marking the servo sector including the region as a defective servo sector when the position error signal is repeatedly detected to be at a high level in the region, and performing servo control by using the position error signal detected from the servo sector positioned ahead of the defective servo sector when a defective servo sector has been detected in a data read or write operation.

20 Claims, 5 Drawing Sheets

TECHNIQUE FOR CONTROLLING THE POSITION ERROR SIGNAL OF A DISK DRIVE

CLAIM OF PRIORITY

This application makes reference to, incorporates the same herein, and claims all benefits accruing under 35 U.S.C. §119 from an application for METHOD FOR CONTROLLING THE POSITION ERROR SIGNAL OF A HARD DISK DRIVE earlier filed in the Korean Industrial Property Office on the day of Jun. 24$^{th}$ 1996 and there duly assigned Ser. No. 23328/1996, a copy of which application is annexed hereto.

BACKGROUND OF THE INVENTION

1. Field of the Invention

The present invention concerns a servo control of a disk drive, and more particularly a technique for controlling a position error signal for securing a servo control of high reliability.

2. Description of the Related Art

Generally a hard disk drive is widely used as a auxiliary memory for writing data transmitted from a host computer and transmitting data to a host computer by reading it. A servo control consists of a track search mode for moving a head to a target track to write and read data by detecting servo information in a disk and a track following mode for positioning a head on a center line of a target track.

In an earlier hard disk drive, a disk is rotated by a spindle motor. A head is positioned above the surface of the magnetic disk and installed on a arm extended vertically from an arm assembly of a voice coil motor. A preamplifier preamplifies a signal picked up by the headduring reading and drives the head for writing encoded write data sent from a read/write channel unit onto a magnetic disk during writing. The read/write channel unit is connected to the preamplifier, A/D converter and a disk data controller and supplies read data to the disk data controller by detecting a data pulse from a signal preamplifier in the preamplifier and encoding and decoding it in order and write data sent from the disk data controller to the preamplifier by encoding it. The read/write channel unit supplies an analog reading signal to the A/D converter by detecting it from a preamplifier signal from the preamplifier.

The A/D converter, connected to the read/write channel unit, receives an analog reading servo reading signal and supplies it to a microcontroller by converting the analog reading signal to position error signal digital data and also supplies an output current from a voice coil motor driver to the microcontroller by converting it into a digital signal. The microcontroller, connected to the disk data controller, controls track detection and track following. The voice coil motor driver, connected to the voice coil motor and the D/A converter, controls the operation of the voice coil motor by control of the microcontroller.

The voice coil motor moves the head on the magnetic disk in accordance with the direction and level of the driving current supplied from the voice coil motor driver.

It is essential to confirm the position of the head in advance of writing and reading data onto the hard disk drive. The microcontroller moves the head to a target track by a preprogrammed servo control algorithm and it further controls the head to be positioned on the center line of the track for reading and writing data after moving the head to a target track. For servo control, a track's own information, "gray code data" and comparison information, "burst data", which are normally called servo information, are written on each track of the disk by its manufacturer.

Two bursts are written on each track in advance as part of the servo information. An A burst and an B burst are written on adjacent tracks alternately, wherein each burst is written on one side of a center line of a track in one track and positioned continuously in the direction of the circumference without overlapping each other. These A and B bursts are detected by the head.

The position error signal is defined to be the difference between the detected A burst detection level and the detected B burst detection level.

The microcontroller controls the head to follow the center line of the track by using the position error signal corresponding to a change of its position. However, it is almost impossible for the position error signal to be zero due to the vibration of the magnetic disk or head and the circuits and apparatus in a hard disk drive. Thus, the position error signal value is changing according to a change of the position of the head.

When there is a defect in a written burst on a track, a problem occurs in that it is impossible to detect a position error signal from a burst region located next to the burst region having a defect. For solving the problem, two earlier methods are as follows.

One method is the maintenance of a servo defect map. This method is the same as the method treating a defective data sector when executing self-test in a hard disk drive. In other words, the microcontroller ignores a position error signal detected from a relevant servo sector by referring to a list of maintenance cylinders when the head is at the relevant servo sector after writing a servo sector repeatedly generating a high state of a position error signal on a maintenance cylinder.

The other method is to swap a track of a servo sector generating a high state of a position error signal for a surplus track.

For executing the two methods, it is necessary for the microcontroller to store a defective track, resulting in an occurrence of a problem of increased overhead of its capacity. The method of swapping a track has a problem in that normal servo sectors of the relevant track of a defective sector can not be used and a surplus track must be used instead.

The following patents each disclose features in common with the present invention but do not teach or suggest the specifically recited technique for controlling the position error signal of a disk drive in accordance with the present invention: U.S. Pat. No. 5,544,135 to Akin Jr. et al., entitled Fault Tolerant Servo Address Mark For Disk Drive, U.S. Pat. No. 5,592,348 to Strang Jr., entitled Method And Structure For Locating And Skipping Over Servo Bursts On A Magnetic Disk, U.S. Pat. No. 5,339,207 to Moon et al., entitled Servo System For Providing Increased Recording Density And Improved Operation Of The AGC Circuitry, U.S. Pat. No. 4,982,297 to Tsujisawa, entitled Head Positioning System For Compensating For Erroneous Detection Of Recorded Position Error Information, U.S. Pat. No. 4,910,617 to Brunnett et al., entitled Disk Drive Head Positioning Servo System Utilizing Encoded Track Zone Information, and U.S. Pat. No. 5,241,433 to Anderson et al., entitled Disk Drive Servo Control.

SUMMARY OF THE INVENTION

It is an object of the present invention to provide a method for controlling a position error signal for performing a servo control regardless of a position error signal detected from a defective servo burst region.

According to the present invention, a method for controlling the position error signal of a hard disk drive using a disk recording a servo burst signal for controlling an on-track position of a head comprises the steps of: checking whether the detected position error signal is detected at a high level from the region recording the servo burst signal, marking the servo sector including the region as a defective servo sector when the position error signal is repeatedly detected to be a high level in the region, and performing servo control by using the position error signal detected from the servo sector positioned ahead of the defective servo sector when the defective servo sector is detected during a data read/write operation.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
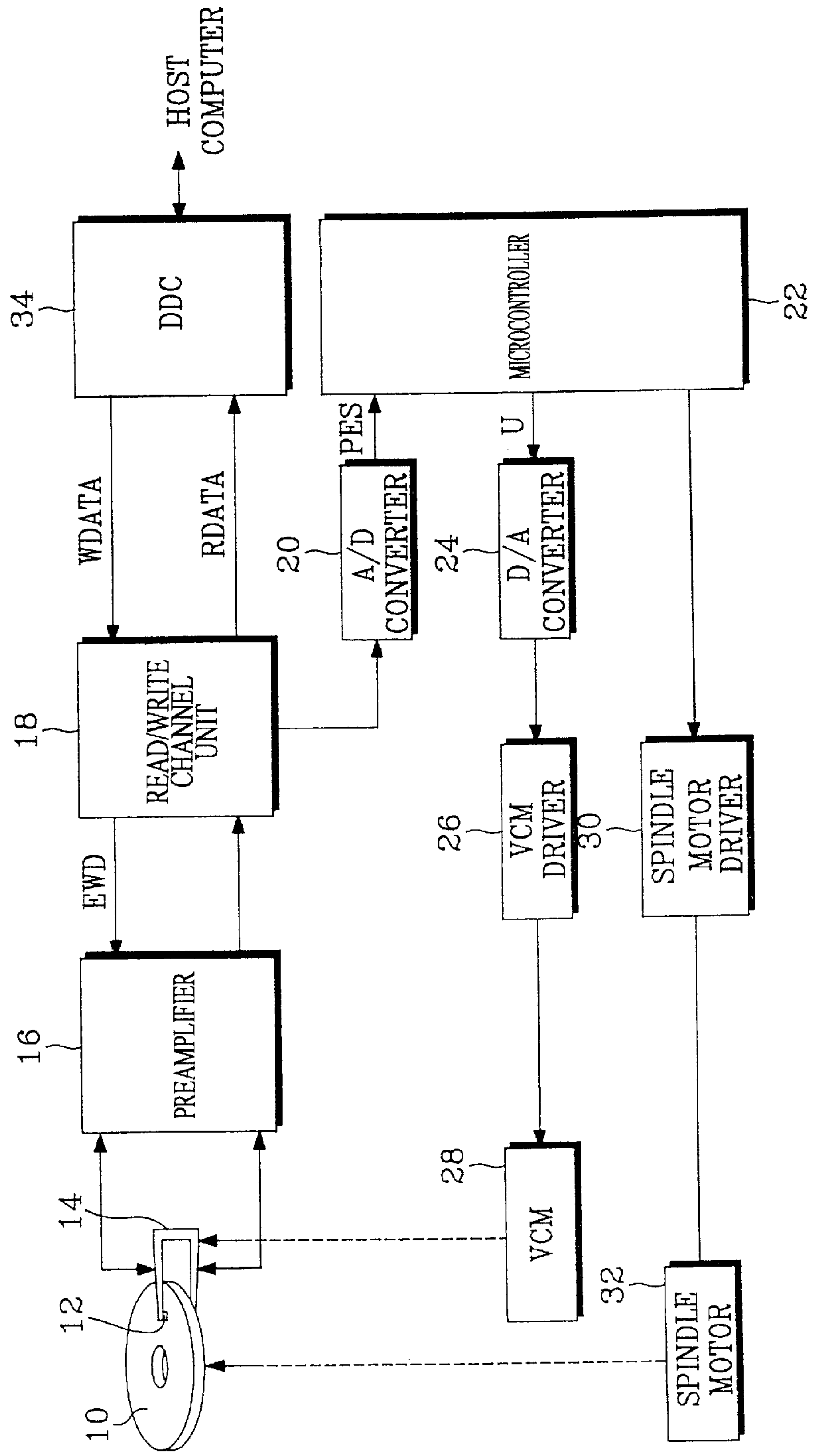
FIG. 1 is a block diagram of an earlier hard disk drive.

Referring to FIG. 1, a disk 10 is rotated by a spindle motor 32. A head 12 is positioned above the surface of the magnetic disk 10 and installed on a arm 14 extended vertically from an arm assembly of a voice coil motor (hereinafter referred to as a 'VCM') 28. A preamplifier 16 preamplifies a signal picked up by the head 12 during reading and drives the head 12 for writing encoded write data sent from a read/write channel unit 18 onto a magnetic disk 10 during writing. The read/write channel unit 18 is connected to the preamplifier 16, an A/D converter 20 and a disk data controller (hereinafter referred to as a 'DDC') 34, and supplies read data to the DDC 34 by detecting a data pulse from a signal preamplifier in the preamplifier 16 and encoding and decoding it in order and write data sent from the DDC 34 to the preamplifier 16 by encoding it. The read/write channel unit 18 supplies an analog reading signal to the A/D converter 20 by detecting it from a preamplifier signal from the preamplifier 16.

The A/D converter 20, connected to the read/write channel unit 18, receives an analog reading servo reading signal and supplies it to a microcontroller 22 by converting the analog reading signal to PES digital data, and also supplies an output current from a VCM driver 26 to the microcontroller 22 by converting it into a digital signal. The microcontroller 22, connected to the DDC 34 controls track detection and track following. A D/A converter 24, connected to the microcontroller 22 and the VCM driver 26, supplies a digital control output signal 'U', received from the microcontroller 22, to the VCM driver 26 by converting it into analog data. The VCM driver 26, connected to the VCM 28 and the D/A converter 24, controls the operation of the VCM 28 by control of the microcontroller 22.

The VCM 28 moves the head 12 on the magnetic disk 10 in accordance with the direction and level of the driving current supplied from the VCM driver 26. The spindle motor driver 30 controls the operation of the spindle motor 32 by control of the microcontroller 22 and the spindle motor 32 rotates the magnetic disk 10. The DDC 34 writes data sent from a host computer on the magnetic disk 10 through the read/write channel unit 18 and transmits data to the host computer by reading data from the magnetic disk 10 according to a read/write instruction of the host computer. The DDC 34 interfaces the servo control of the microcontroller 22 according to the read/write instruction of the host computer.

Thus, it is essential to confirm the position of the head 12 in advance in writing and reading data onto the hard disk drive. In this case, the microcontroller 22 moves the head 12 to a target track by a pre-programmed servo control algorithm, and it further controls the head 12 to be positioned on a center line of the track (on-track) for reading and writing data after moving the head 12 to a target track. For servo control, a track's own information, "gray code data", and comparison information, "burst data", which are normally called servo information, are written on each track of the disk 10 by its manufacturer. Referring to FIGS. 2, 3A–3C and 4, a step for following a track by using burst data will be described as follows.

Figure 2:
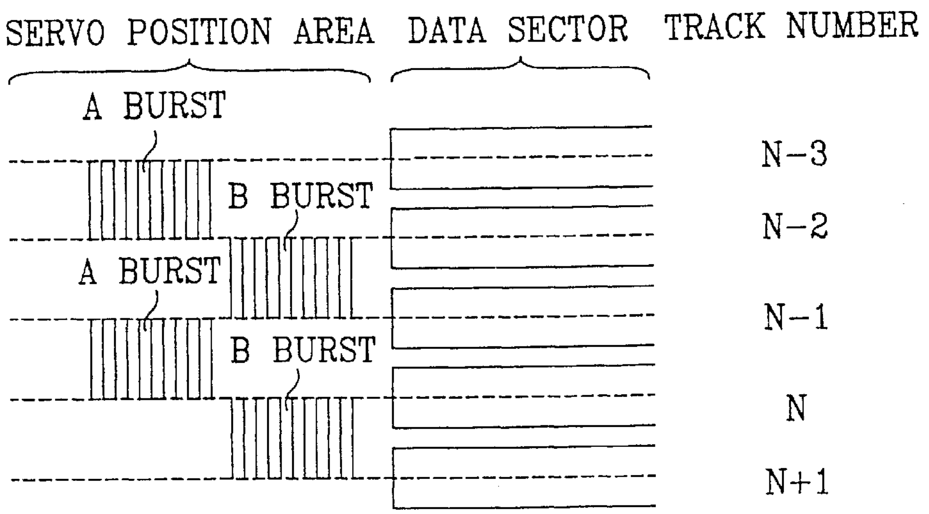
FIG. 2 is a graph illustrating a write form of burst signal recorded on a magnet disk for following a track in a hard disk drive.

FIG. 2 illustrates a write form of a burst signal, and two bursts are written on each track in advance as a part of the servo information. An Aburst and a B burst are written on adjacent tracks alternately, wherein each burst is written on one side of a center line of a track in one track and positioned continuously in the direction of the circumference without overlapping each other. These 'A' and 'B' burst are detected by the head 12.

Figure 3A:
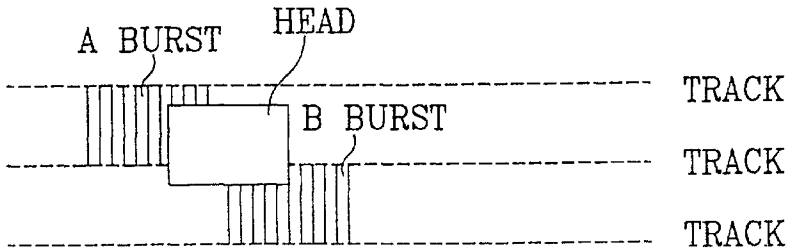
FIGS. 3A, 3B & 3C are graphs illustrating positions changes of a head in following a track.
Figure 3B:
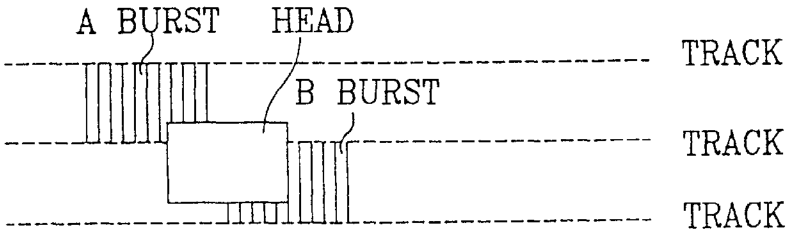
Figure 3C:
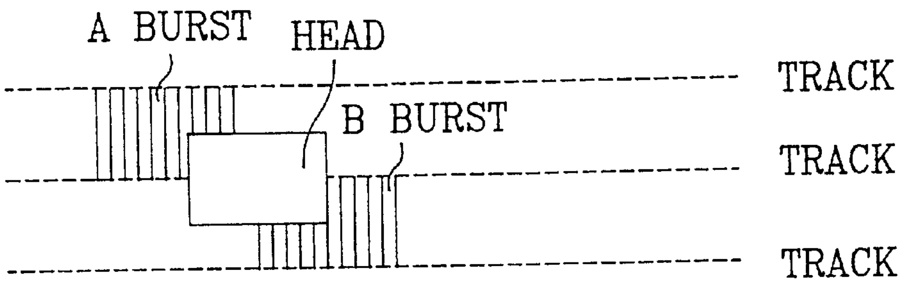

Referring to FIGS. 3A–3C, the detection level of the A burst becomes larger than that of the B burst when the head 12 is not in the center line and is deviated toward the A burst side and vice versa. An amplitude of one burst is as same as that of the other burst, being one half of a maximum detection level. The difference in the detection level between the A and B bursts is zero when the head is correctly in the center line of track. Therefore, the state and scale of the deviation of the head to the center line of the track is obtained by the difference of detection level between the Aburst and the B burst, and a signal representing the difference is a position error signal (hereinafter referred to as a 'PES'). The PES is defined by the equation (1) as follows.

$$\text{PES} = \text{A burst detection level} - \text{B burst detection level} \qquad (1)$$

The PES value represents the deviation of the head and the position of the head being deviated to the A burst side is positive and to the B burst side is negative and being positioned correctly in the center line of the track is zero.

Thus, the microcontroller 22 controls the head 12 to follow the center line of the track by using the PES corresponding to a change of its position. But it is almost impossible for the PES to be zero due to vibration of the magnetic disk or head and the circuits and apparatus in a hard disk drive. Thus, the PES value is changing according to a change of position of the head.

Figure 4:
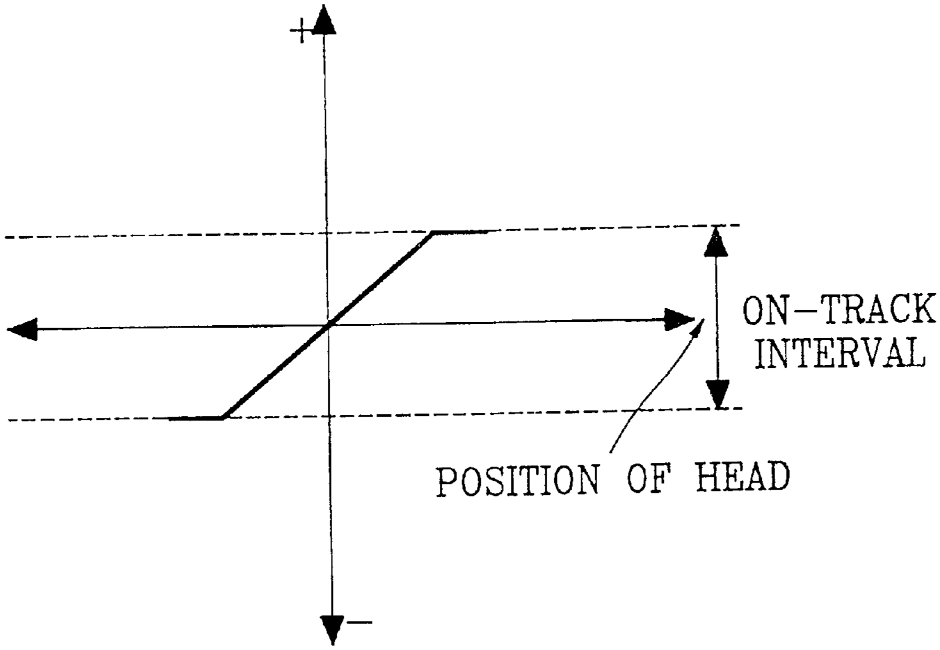
FIG. 4 is a graph illustrating a change of position error signal according to changes of a head in following a track.

Referring to FIG. 4, a case of PES value being within one divided value is defined as 'On Track' and a case of it being out of one divided value is defined as 'Off Track' by dividing PES value from maximum to minimum equally into plurality of values. A PES may be always in a high state when a burst is not written normally due to a defect in the burst region, an impact during the servo writing and some marginal reasons in detecting a PES. The microcontroller 22 performs position control to let the head 12 be 'On Track' by confirming the head 12 being out of 'On Track' when the PES is always in a high state due to a burst defect. Accordingly, there occurs a problem in that it is impossible to detect a PES from a burst region located next to the burst region having a defect. For solving the problem, there are two methods in earlier technology as follows.

One method is the maintenance of a servo defect map. This method is same as the method treating a defective data sector when executing self-test in a hard disk drive. In other words, the microcontroller 22 ignores a PES detected from a relevant servo sector by referring to list of maintenance cylinders when the head 12 is at the relevant servo sector after writing a servo sector repeatedly generating a high state of a PES on a maintenance cylinder. The other method is to swap a track of a servo sector generating a high state of a PES for a surplus track. For executing the two methods, it is necessary for the microcontroller 22 to store a defective track, resulting in an occurrence of a problem of increased overhead of its capacity. The method of swapping a track has a problem in that normal servo sectors of the relevant track of a defective sector can not be used and a surplus track must be used instead.

Generally, writing is impossible due to a write protect in a conventional servo sector. So it is possible to erase a servo write pattern of fixed section by using established write gate timing and detecting a defective servo sector in a self test mode of a hard disk drive.

Figure 5:
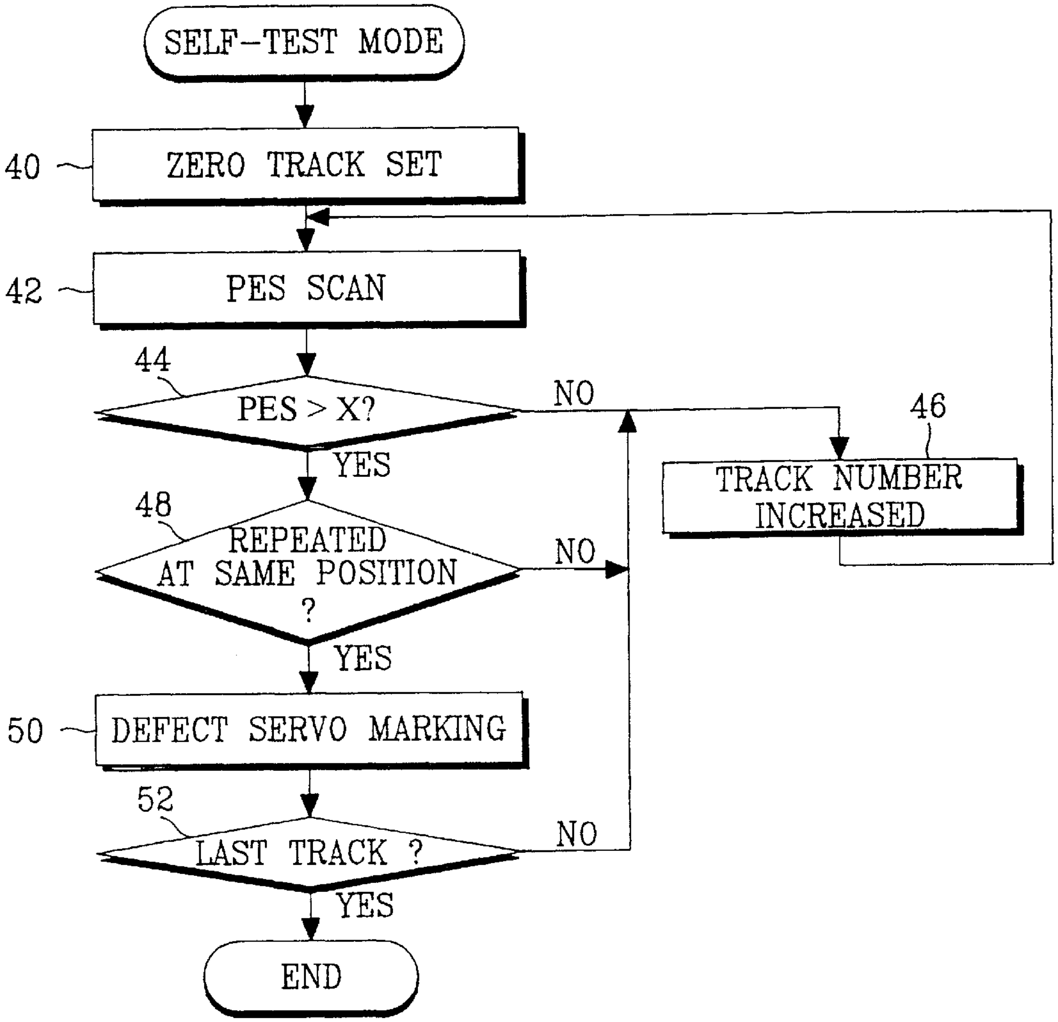
FIG. 5 is a flowchart illustrating the operation of marking an error indication on a certain region of a servo sector repeatedly generating a high level position error signal in a self test mode.

Referring to FIG. 5, The microcontroller 22 scans a PES of each servo sector in step 42 after setting a zero track in step 40. In step 44, the microcontroller 22 compares the scanned PES with prescribed On-Track region 'X'. When the scanned PES is within the prescribed On-Track 'X' value, the microcontroller 22 repeats the steps 42 and 44 after increasing the track number by one in step 46. When the scanned PES is larger than the 'X' value, the microcontroller 22 determines whether the scanned PES is repeatedly larger than the 'X' value at the same position of the same servo sector in step 48. Thereafter, the microcontroller 22 erases a servo write pattern at a fixed distance from servo address mark region or marks a specific pattern on it for indicating a defective servo sector in step 50.

Figures 6A, 6B, 6C, 6D:
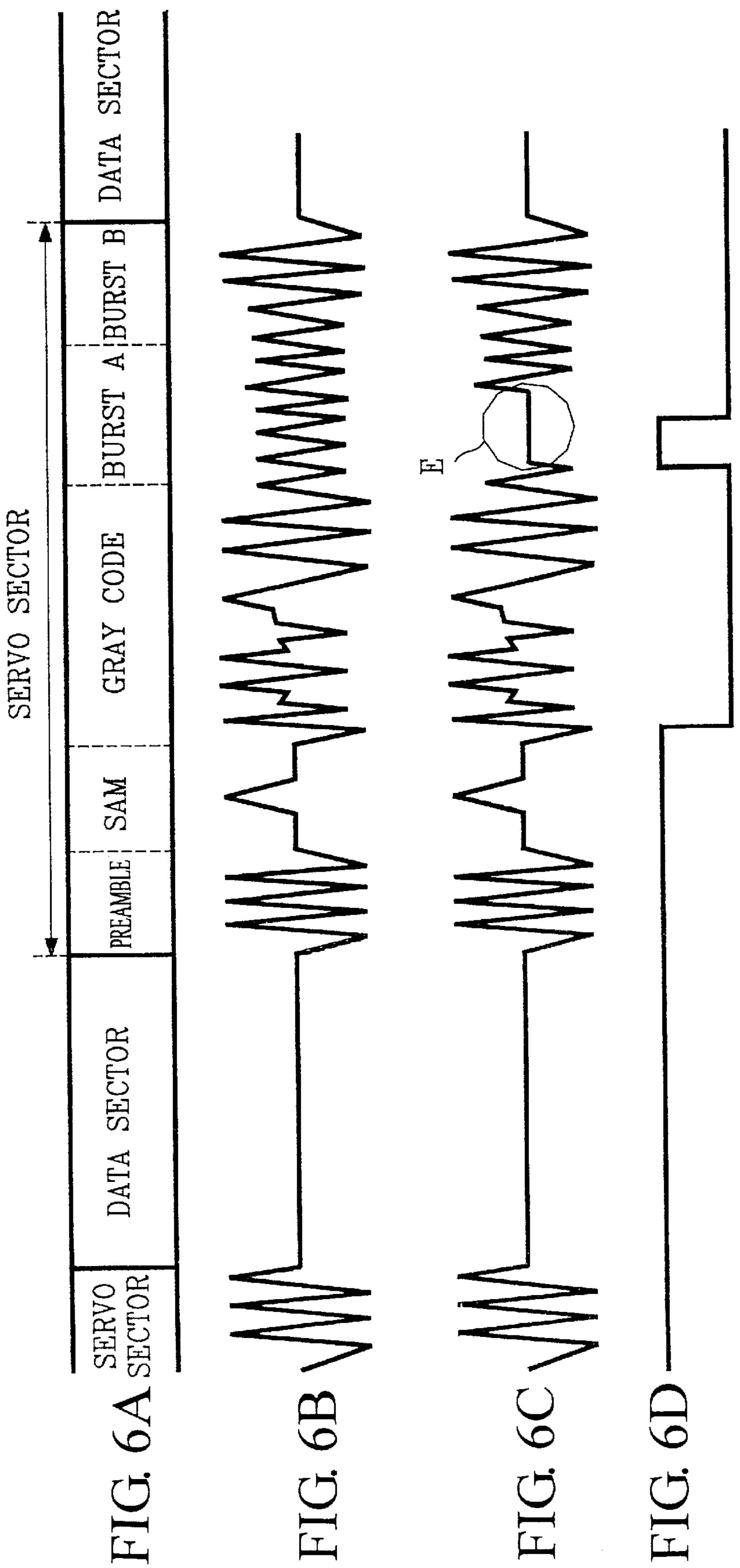
FIGS. 6A–6D are graphs illustrating the timing of servo and the erasure of servo write pattern on the position being at fixed distance from an SAM region when a defective sector occurs.

1. FIG. 6A illustrates a sector format of a servo sector and data sector being positioned alternately, FIG. 6B illustrates a read signal detected from servo write pattern of the servo sector by the head and indicates the detection of normal servo write pattern. FIG. 6C illustrates a read signal in case of erasing a servo write pattern at a fixed distance from servo address mark region when a high PES is repeatedly detected due to a defect occurrence on a burst (A or 15
2. B) region, a shock in servo writing or marginal reasons in step 50 of the self test mode. The microcontroller 22 repeats the steps 42 to 52 after increasing the track number in step 46 when the track of the PES scanned is determined not to be the last track in step 52. In other hand, the microcontroller 22 completes the step of marking a defective servo sector when the track of the PES scanned is the last track. So the microcontroller 22 performs servo control regardless of a high PES detected from a defective servo sector, responding to a non-existence of a signal from erased region or a specific signal pattern marked on a certain region of a servo sector in a data read/write operation.

The peak value of a servo write pattern read by the head 12 is sampled and held by the read/write channel unit and transferred to the A/D converter 20. The microcontroller 22 updates each PES from the A/D converter 20 and performs servo control accordingly. When detecting the non-existence of a signal read from an erased region, the microcontroller 22 disables an enabled PES and nullifies the PES detected from the relevant defective servo sector. In other words, the microcontroller 22 performs servo control by using the PES detected from a servo sector positioned in front of the defective servo sector regardless of the PES detected after the erased region. Accordingly, the microcontroller 22 performs on-track position control by using the PES detected from the servo sector positioned in front of the defective servo sector regardless of PES value from defective servo sector.

Accordingly, the improvement of productivity and reliability of a hard disk drive and the prevention of its false operation are secured by performing servo control regardless of the PES detected from the marked defective servo sector in a data read/write operation after marking a defective servo sector in a self test mode of a hard disk drive.

By way of one example of the present invention, the servo control is performed by erasing a servo write pattern of certain region of a relevant defective servo sector in case of defective servo sector occurring. By way of another example, it can be performed by detecting a specific signal pattern, i.e. two bits of binary information regardless of the PES from a relevant defective servo sector after writing the specific signal pattern on the relevant specific signal pattern.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of controlling the position error signal of a disk drive using a disk recording a servo burst signal for controlling an on-track position of a head, comprising the steps of:

checking whether said position error signal is detected to be at a high level from the region recording said servo burst signal;

marking a servo sector including said region as a defective servo sector when said position error signal is repeatedly detected as being at a high level in said region; and performing servo control by using said position error signal detected from the servo sector positioned ahead of said defective servo sector when said defective servo sector has been detected in a data read or write operation.

2. A method as defined in claim 1, the steps of checking and marking being performed in a disk drive self-test mode.

3. A method as defined in claim 2, the value of the position error signal in the high level state being larger than that of the position error signal in an on-track region.

4. A method as defined in claim 3, the step of marking being performed by erasing a servo write pattern of a certain region by using a write gate timing of the relevant defective servo sector.

5. A method as defined in claim 4, the servo write pattern of said certain region being positioned ahead of the region recording the servo burst signal of said defective servo sector.

6. A method as defined in claim 3, the step of marking being performed by writing a specific signal pattern on a certain region by using the write gate timing of the relevant defective servo sector.

7. A method as defined in claim 6, the specific signal pattern written on said certain region being positioned ahead of the region recording the servo burst signal of said defective servo sector.

8. A method as defined in claim 2, the step of marking being performed by erasing a servo write pattern of a certain region by using a write gate timing of the relevant defective servo sector.

9. A method as defined in claim 8, the servo write pattern of said certain region being positioned ahead of the region recording the servo burst signal of said defective servo sector.

10. A method as defined in claim 2, the step of marking being performed by writing a specific signal pattern on a certain region by using the write gate timing of the relevant defective servo sector.

11. A method as defined in claim 10, the specific signal pattern written on said certain region being positioned ahead of the region recording the servo burst signal of said defective servo sector.

12. A method as defined in claim 1, the value of the position error signal in the high level state being larger than that of the position error signal in an on-track region.

13. A method as defined in claim 12, the step of marking being performed by erasing a servo write pattern of a certain region by using a write gate timing of the relevant defective servo sector.

14. A method as defined in claim 13, the servo write pattern of said certain region being positioned ahead of the region recording the servo burst signal of said defective servo sector.

15. A method as defined in claim 12, the step of marking being performed by writing a specific signal pattern on a certain region by using the write gate timing of the relevant defective servo sector.

16. A method as defined in claim 1, the step of marking being performed by erasing a servo write pattern of a certain region by using a write gate timing of the relevant defective servo sector.

17. A method as defined in claim 16, the servo write pattern of said certain region being positioned ahead of the region recording the servo burst signal of said defective servo sector.

18. A method as defined in claim 16, the step of marking being performed by writing a specific signal pattern on a certain region by using the write gate timing of the relevant defective servo sector.

19. A method as defined in claim 1, the step of marking being performed by writing a specific signal pattern on a certain region by using the write gate timing of the relevant defective servo sector.

20. A method as defined in claim 19, the specific signal pattern written on said certain region being positioned ahead of the region recording the servo burst signal of said defective servo sector.

* * * * *